(12) United States Patent
Otten et al.

(10) Patent No.: US 8,191,854 B2
(45) Date of Patent: Jun. 5, 2012

(54) DEVICE, ARRANGEMENT AND METHOD FOR MANUFACTURING A COMPONENT

(76) Inventors: Vidina Otten, Zetel (DE); Dirk Siebrecht, Varel (DE)

( * ) Notice: Subject to any disclaimer, the term of this patent is extended or adjusted under 35 U.S.C. 154(b) by 907 days.

(21) Appl. No.: 11/360,888

(22) Filed: Feb. 23, 2006

(65) Prior Publication Data

US 2006/0186580 A1     Aug. 24, 2006

Related U.S. Application Data

(60) Provisional application No. 60/656,270, filed on Feb. 24, 2005.

(30) Foreign Application Priority Data

Feb. 24, 2005    (DE) .......................... 10 2005 008 479

(51) Int. Cl.
     *B28B 7/34*      (2006.01)

(52) U.S. Cl. .......... 249/134; 249/60; 249/135; 425/110; 425/542; 264/405

(58) Field of Classification Search ............... 425/110, 425/542, 233, 405.1, 129.1, 547; 264/405, 264/561; 249/60, 134, 135
See application file for complete search history.

(56) References Cited

U.S. PATENT DOCUMENTS

| | | | |
|---|---|---|---|
| 4,225,109 A * | 9/1980 | Yotsutsuji et al. ............ | 249/111 |
| 4,245,698 A * | 1/1981 | Berkowitz et al. ......... | 166/244.1 |
| 6,494,704 B1 * | 12/2002 | Andersen et al. ............ | 425/258 |
| 2002/0139455 A1 * | 10/2002 | Kuehmann et al. ............ | 148/621 |

FOREIGN PATENT DOCUMENTS

| | | |
|---|---|---|
| DE | 966788 | 9/1957 |
| DE | 69713577 T2 | 2/2003 |
| EP | 0197709 A2 | 10/1986 |
| JP | 62-189120 | 12/1987 |
| WO | WO 92/10347 | 6/1992 |
| WO | WO 00/54949 | 9/2000 |
| WO | WO 02/074469 | 9/2002 |
| WO | WO 2005/070642 * | 8/2005 |
| WO | WO 2005/070642 A1 | 8/2005 |

OTHER PUBLICATIONS

European Search Report. 9 pages.
Lin, Robert. W., "Early Cost Estimation for Manufacturing of Tooling in Resin Transfer Molding" MURJ vol. 3, (2000) pp. 61-64.
Special Metals Corporation, "A Word About Invar" Publication No. SMC-051, (2001) pp. 2-11.
ThyssenKrupp VDM, "Krupp VDM gets Airbus into shape" Metal Times (2002 by ThyssenKrupp VDM GmbH, online: http://metaltimes.de/MT22/E__Artikel-08.aspx 2 pages.

* cited by examiner

*Primary Examiner* — Christina Johnson
*Assistant Examiner* — Saeed Huda
(74) *Attorney, Agent, or Firm* — Ingrassia Fisher & Lorenz, P.C.

(57) ABSTRACT

A device for manufacturing a component comprises a trough, into which starting material for manufacturing the component can be introduced, a cover that can be attached to the trough in such a way that starting material for manufacturing the component is enclosed between the trough and the cover, a heating device for manufacturing the component by heating starting material that can be enclosed between the trough and the cover, wherein the trough is manufactured from a material with a coefficient of expansion that is essentially identical to the coefficient of expansion of the starting material for manufacturing the component.

19 Claims, 11 Drawing Sheets

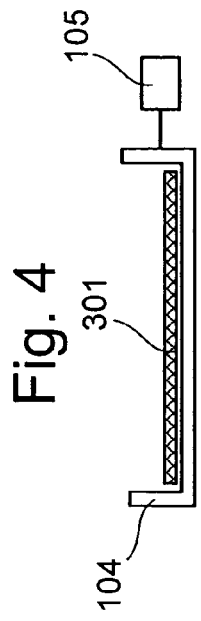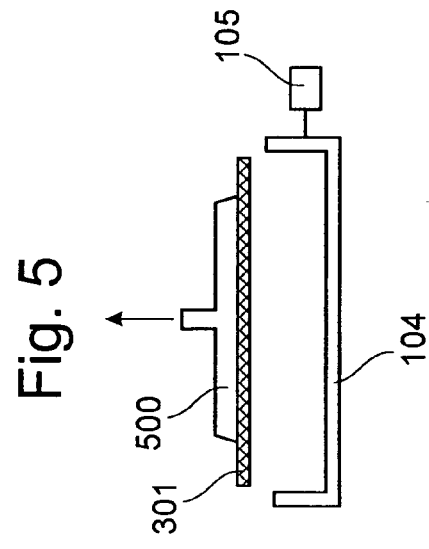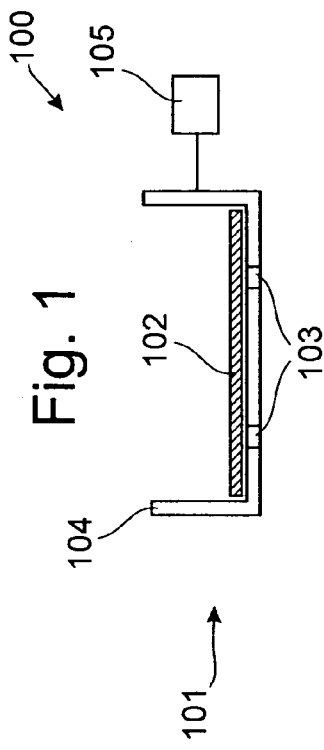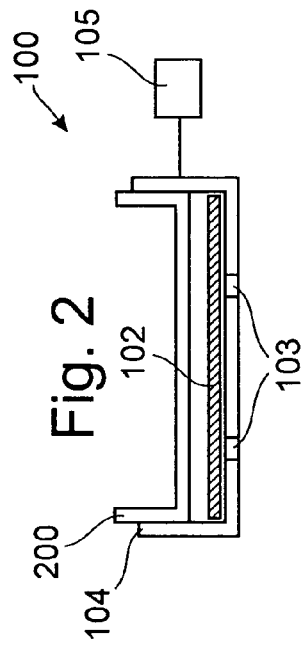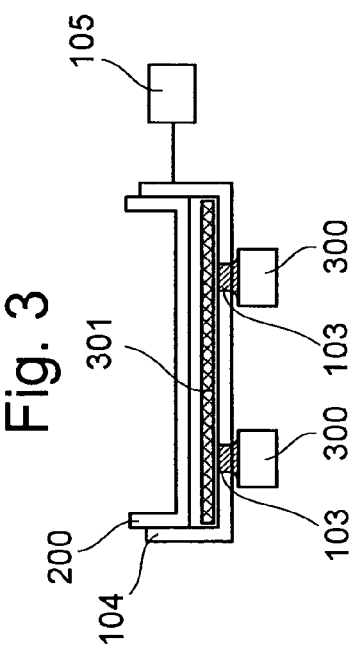

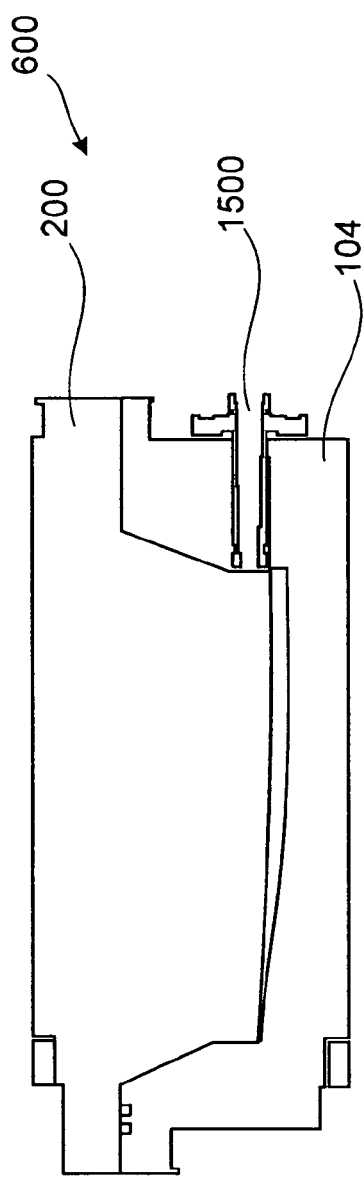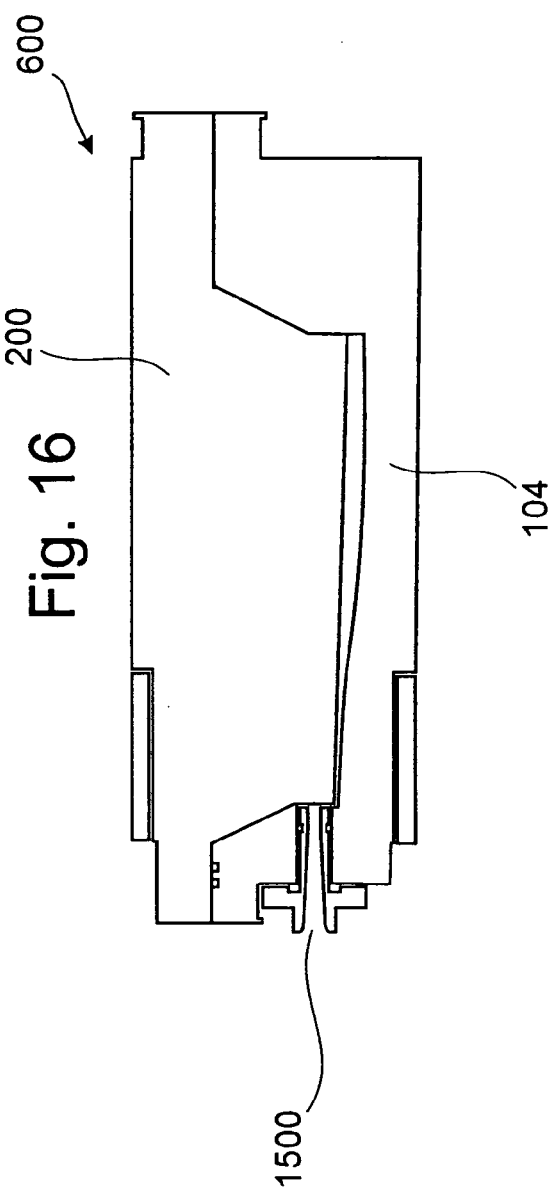

DEVICE, ARRANGEMENT AND METHOD FOR MANUFACTURING A COMPONENT

REFERENCE TO RELATED APPLICATIONS

This application claims the benefit of the filing date of German Patent Application No. 10 2005 008 479.6 filed Feb. 24, 2005, and claims the benefit of the filing date of U.S. Provisional Patent Application No. 60/656,270 filed Feb. 24, 2005, the disclosure of which is hereby incorporated herein by reference.

FIELD OF THE INVENTION

The invention relates to a device, an arrangement and a method for manufacturing a component.

TECHNOLOGICAL BACKGROUND

In so-called "Resin Transfer Molding" methods (RTM methods), complex composite fiber plastics with a high volumetric fiber content are produced by impregnating dry semi-finished fiber products with resin. The RTM method is also referred to as resin injection method and represents a complete process that makes it possible to achieve close manufacturing tolerances with respect to component weight, volumetric fiber content and component dimensions. In the technical realization of this method, a dry semi-finished fiber product is placed into a heated tool that is divided into two parts and brought in functional contact with a low-viscosity resin under pressure. During this process, the resin flows through the fiber layers and, after having impregnated the fibers, is discharged through ventilation openings.

In the RTM method, a lower mold may be provided with fiber mats and, if applicable, additional parts (for example, foam cores). After the lower mold is closed with an upper mold, the closed molds are subjected to a vacuum and the resin is injected by a pump. A composite component is then manufactured under the influence of heat, wherein said composite component can subsequently be removed from the mold after it is opened.

Composite fiber plastics manufactured with the aid of the RTM method can be utilized in numerous fields, e.g., as structural components in the manufacture of automobiles or in the aircraft and spacecraft industry. Examples of fiber-reinforced plastic products include mountings for a rudder unit of an aircraft, paneling elements for passenger cars as well as elevated roof and wind deflection systems for motor trucks.

Consequently, the RTM method makes it possible to manufacture composite components. Depending on the tool design and the material selection, it is possible to manufacture components with their final dimensions.

Different variations of the RTM method have been devised. In one resin injection method, structural components of fiber-reinforced plastic are produced by placing dry semi-finished fiber products into a mold cavity, subsequently closing said cavity and injecting the liquid resin. The closed molding results in defined dimensional and positional tolerances of the components on all sides. The term closed molding refers to a solid (for example, metallic) cavity comprising at least two mold halves that are called the upper cavity and the lower cavity.

In known devices for manufacturing a component by means of the RTM method, one encounters the problem that the tool may shrink onto the component during the cooling process. The component can only be removed from the mold without being damaged by utilizing rotary inserts (cores and wedges) that are inserted between the trough and the cover on one hand and the material for manufacturing the component on the other hand. After this manufacturing method, resin residues need to be laboriously removed from the tool as well as the inserts. This results in significant wear of the tool and the inserts.

This wear lowers the quality of the component being manufactured with respect to its dimensional stability, surface quality and edge structure. One consequence of this is a high reject rate.

SUMMARY OF THE INVENTION

According to an exemplary embodiment of the invention, a device for manufacturing a component, an arrangement for manufacturing a component and a method for manufacturing a component with the features according to the independent claims are provided.

According to an exemplary embodiment of the invention, a device for manufacturing a component is provided, wherein the device comprises a trough, into which starting material for manufacturing the component can be introduced. The device further comprises a cover that can be attached to the trough in such a way that starting material for manufacturing the component is enclosable between the trough and the cover. A heating device is provided for manufacturing the component by subjecting starting material that can be enclosed between the trough and the cover to heat. The trough is manufactured from a material with a coefficient of expansion that is essentially identical to the coefficient of expansion of starting material for manufacturing to component.

According to another exemplary embodiment of the invention, an arrangement for manufacturing a component is provided, wherein the arrangement comprises a device with the above-described features as well as starting material for manufacturing the component that can be introduced into the trough of the device or is at least partially introduced into the trough.

According to another exemplary embodiment of the invention, a method for manufacturing a component is provided, in which starting material for manufacturing the component is introduced into a trough, a cover is attached to the trough in such a way that the starting material for manufacturing a component is enclosed between the trough and the cover, and the starting material enclosed between the trough and the cover is heated in order to manufacture the component. The trough may be manufactured from a material with a coefficient of expansion that is essentially identical to the coefficient of expansion of the starting material for manufacturing the component.

This may allow to realize the manufacture of a component with reduced expenditures.

In the context of this application, the term "coefficient of expansion" refers to the linear coefficient of expansion $\alpha$ that describes the expansion of a body under the influence of a temperature change and is expressed in $K-1$.

The coefficient of expansion of the trough should be essentially identical to the coefficient of expansion of the material for manufacturing the component, preferably over the entire temperature range of the processing method, i.e., particularly in the range between 20° C. and 200° C.

In the context of this application, the term "essentially identical coefficient of expansion" also includes a coefficient of expansion of the trough and/or the cover that slightly deviates (for example, by a few percent) from the coefficient of expansion of the starting material for manufacturing the component, particularly a coefficient of expansion of the trough and/or the cover that is slightly lower than the coefficient of expansion of the starting material for manufacturing the component.

One exemplary aspect of the invention can be seen in that at least part of a tool for manufacturing a component consists of a material that has a coefficient of expansion similar to that of the material for the component to be manufactured. When the starting material is heated together with this part of the tool (trough and/or cover) during the manufacturing process, the coefficients of expansion of the tool and of the component material, if chosen in accordance with the invention, may make it possible to reliably prevent an undesirable shrinking of the component onto the tool after the cooling of the hardened component. Consequently, the component can be removed from the cooled device without the assistance of costly auxiliary means because it essentially no longer adheres to the tool. This may prevent mechanical tensions from occurring between the tool and the component. In addition, the wear of the tool may be also significantly reduced such that the service life of the tool is extended. It may be also no longer required to carry out a complicated cleaning process. Additional inserts between the component and the trough/the cover are dispensible. The method according to an exemplary embodiment of the invention for manufacturing a component therefore is automated, simplified and significantly improved with respect to the cleaning expenditure and the wear.

The method and the device according to an exemplary embodiment of the invention can be utilized in the context of a RTM method ("Resin Transfer Molding," resin injection method). According to an exemplary embodiment of the invention, composite components, for example, of glass-fiber reinforced plastic (GFRP) or of carbon-fiber reinforced plastic (CFRP), can be manufactured in a tool that comprises a nickel-steel alloy with sufficiently low nickel content.

In a corresponding manufacturing method, a semi-finished product in the form of, for example, a fiber mat is placed between the cover and the trough. The region between the cover and the trough can then be tightly sealed, heated and subjected to a vacuum. An additional liquid starting material (for example, epoxy resin RTM6) can then be injected into the trough through injection holes. The starting materials harden once they are heated to a hardening temperature of, for example, approximately 180° C. (generally to a temperature in a preferred temperature range between 150° C. and 200° C.) in order to produce the component. After the device and the component are cooled, the component can be easily removed from the trough after the cover is removed because the adaptation of the coefficients of expansion of the trough material and the component material in accordance with an exemplary embodiment of the invention prevents an undesirable shrinking of the component onto the trough. For example, the component can be removed from the trough with a low expenditure of force and without being damaged, namely either manually or with a simple vacuum suction device, without components of the starting material adhering to the trough or the cover. This may significantly lowers the expenditure for cleaning the device.

According to an embodiment, the invention makes available a two-part tool without inserts for manufacturing plane composite components by means of a RTM method (Resin Transfer Molding). This may make it possible, for example, to easily and efficiently manufacture composite components from glass-fiber reinforced plastics (GFRP) or from carbon-fiber reinforced plastics (CFRP). For example, an exemplary embodiment of the invention makes it possible to manufacture components, e.g., for mountings, that are suitable for use in an aircraft (such as passenger aircraft). Another an exemplary embodiment of the invention can be seen in that the utilization of the tool makes it possible to easily remove the component from the opened tool, for example, with the aid of a simple vacuum suction device.

For example, the utilization of a nickel-33-cobalt steel alloy (i.e., an alloy with 33 wt. % nickel) as the tool material for the trough and, if applicable, for the cover makes it possible to realize the tool without inserts, for example, for plane mountings. The injection of the resin and the removal of the resin by suction can be integrated, for example, into the lower mold part (trough) of the device for manufacturing a component. The upper mold part (cover) of the device can also be manufactured from such a material. Nickel-33-cobalt steel has such a coefficient of expansion that a CFRP component automatically shrinks off the tool when it cools after the injection and hardening processes. After lifting off the upper mold part, the composite component can be removed without any additional expenditure of force by means of a simple vacuum suction device.

The device according to an exemplary embodiment of the invention can be easily cleaned after the manufacturing process. This is achieved in that no cavities for adhering resin are formed between the inserts in the tool according to the invention because no inserts are required, and in that small dimensions of the gap between the upper mold part and the lower mold part are possible. This means that, according to an exemplary embodiment of the invention, the risk of mechanical damages to the device during the removal of the respective component is effectively eliminated. Inlet and outlet channels (for resin) in nozzles that are provided, for example, in the lower mold part or the trough are realized such that they can be cleaned by knocking out resin residues from the outside toward the inside.

Components manufactured in accordance with an exemplary embodiment of the invention are also clean, dimensionally accurate and free of resin accumulations in the edge region. This means that, according to an exemplary embodiment of the invention, the service life of the tool is extended and the quality of the components is improved, wherein the time and the expenditure for the set-up, the removal from the mold and the cleaning process are also significantly reduced. Another exemplary embodiment of the invention can be seen in that the technology can be inexpensively automated.

The device according to an exemplary embodiment of the invention is suitable, for example, for the manufacture of composite structural elements for aircraft, for example, for a rudder unit. For example, a carbon fiber mat that may already be pre-impregnated with a certain quantity of resin (for example, 5 wt. %) may be used as starting material for the manufacture of such a component. After the carbon fiber mat is placed between the trough and the cover, additional resin material can be introduced before or during the hardening process by means of an injection device, wherein this additional resin is mixed with the material of the carbon fiber mat in order to form the component after the heating process. The quantity of resin injected for this purpose may amount, for example, to 40 wt. %, wherein this also includes the quantity of resin required for pre-impregnating the carbon fiber mat.

The material for the trough and, if applicable, the material for the cover may be, for example, an alloy the contains 33 wt. % nickel, 4 wt. % cobalt and, if applicable, small quantities of additional materials (for example, less than 0.01 wt. % carbon, less than 0.5 wt. % manganese and less than 0.4 wt. % silicon), wherein the remainder is steel. For example, it is possible to utilize an alloy of steel and nickel, wherein the nickel content may lie below 36 wt. %, for example, between approximately 30 and approximately 35 wt. %. Optionally, a small quantity of cobalt may be added, for example, between 1 and 7 wt. %.

The coefficient of thermal expansion of the trough (and, if applicable, of the cover) advantageously may be similar to the coefficient of expansion of the material for manufacturing to component (for example, CFRP, i.e., carbon-fiber reinforced plastic) at a hardening temperature of typically 180° C.

CFRP has a coefficient of expansion of approximately $1.1 \cdot 10\text{-}6$ K$-1$ to $1.2 \cdot 10\text{-}6$ K$-1$. The material of the trough (and, if applicable, of the cover) may advantageously have a coefficient of thermal expansion in the range between $1.1 \cdot 10\text{-}6$ K$-1$ and $1.2 \cdot 10\text{-}6$ K$-1$, preferably between $1.0 \cdot 10\text{-}6$ K$-1$ and $1.3 \cdot 10\text{-}6$ K$-1$. Another suitable range for the coefficient of thermal expansion of the trough (and, if applicable, of the cover) lies between $0.8 \cdot 10\text{-}6$ K$-1$ and $1.8 \cdot 10\text{-}6$ K$-1$ at the hardening temperature.

For example, when using the above-described nickel-33-cobalt steel alloy, its coefficient of expansion at the hardening temperature lies, for example, at $1.5 \cdot 10\text{-}6$ K$-1$. Suitable materials for the trough (and, if applicable, for the cover) are Pernifer-33Co, Superinvar or Invar. Invar is an iron-nickel alloy with an extremely low coefficient of expansion in the room temperature range (approximately 10% of the coefficient of expansion of steel).

Exemplary additional embodiments of the invention are disclosed in the dependent claims.

Embodiments of the device according to the invention for manufacturing a component are described below. These embodiments also apply to the arrangement and to the method for manufacturing a component.

The device may comprise an injection device for introducing starting material for manufacturing the component between the trough and the cover in a state, in which the cover is attached to the trough. In a RTM method, a semi-finished product, for example, is placed between the trough and the cover and a liquid material is subsequently injected through injection nozzles in the cover or in the trough in order to produce a component from the solid starting material and the liquid starting material at a high processing temperature.

The injection device may be arranged in the trough (for example, integrated therein). Alternatively, the injection device may also be arranged in the cover or in the trough and in the cover. The injection device makes it possible to introduce a starting material into the region between the trough and the cover, namely even in an operating state, in which the trough and the cover are tightly closed such that the region in between is sealed.

The cover of the device may be manufactured from a material that has a coefficient of expansion greater or equal to the coefficient of thermal expansion of the material of the trough. Although the trough and the starting material should approximately have the same coefficients of expansion in order to prevent the cooling component from shrinking onto the trough after the component is finished, it may be advantageous if the cover is manufactured from a material with a slightly higher coefficient of expansion. This may simplify the removal of the cover after the cooling process.

In the device, the trough and/or the cover may be manufactured, in particular, from a material with such a coefficient of expansion that a component being manufactured shrinks off the trough and/or off the cover. In other words, the materials can be chosen such that the finished component automatically separates from the cover or the trough, respectively, after the cooling process. The coefficient of expansion of the materials can be correspondingly adjusted correspondingly.

It is also possible to choose the material of the component identical to the material of the trough or the cover, respectively, namely because this automatically ensures that the coefficients of expansion of the tool and of the component do not significantly differ so that an undesirable shrinking of the component onto the tool is prevented during the cooling process.

The trough and/or the cover may be manufactured from a material with a coefficient of expansion that deviates from the coefficient of expansion of the starting material for manufacturing the component by less than 25%, preferably less than 10%, particularly less than 5%. This may allow the removal of the finished component from the tool without essentially any force.

The trough and/or the cover may be manufactured from a material with a coefficient of expansion between $1.0 \cdot 10\text{-}6$ K$-1$ and $1.3 \cdot 10\text{-}6$ K$-1$, preferably between $1.1 \cdot 10\text{-}6$ K$-1$ and $1.2 \cdot 10\text{-}6$ K$-1$. These coefficients of expansion are particularly advantageous in the manufacture of components from a CFRP material, i.e., a carbon-fiber reinforced plastic.

The cover may be manufactured from a material with a coefficient of expansion that is higher than the coefficient of expansion of the material of the trough by no more than $0.2 \cdot 10\text{-}6$ K$-1$, preferably no more than $0.1 \cdot 10\text{-}6$ K$-1$. This combination ensures that the removal of the cover and the subsequent removal of the component from the trough can be realized without a high expenditure of force and a substantial cleaning effort.

The trough and/or the cover may be manufactured from a nickel-steel alloy. This nickel-steel alloy, in particular, may contain less than 36 wt. % nickel, preferably about 33 wt. % nickel. The nickel-steel alloy may also have a cobalt content such that it would be realized in the form of a nickel-cobalt-steel alloy in this case.

Embodiments of the arrangement according to the invention are described below. These embodiments also apply to the device according to the invention and to the method according to the invention.

In the arrangement, the starting material for manufacturing a component can be directly introduced between the trough and the cover or be at least partially introduced therein.

According to the invention, the manufacture of plane components does not require the utilization of inserts between the starting material on one hand and the trough/cover on the other hand because the choice of the coefficients of expansion reliably prevents the component from adhering after the cooling process.

The arrangement may also comprise a vacuum suction device for removing the finished component from the arrangement after the cover is removed. For example, simple suction cup elements or a suction device that utilizes a mechanical or electrical pump may be considered for this purpose.

Embodiments of the method according to the invention are described below. These embodiments also apply to the device and to the arrangement.

The method may be realized for manufacturing a composite component, particularly a composite component for use in an aircraft.

The method may also be realized in the form of a resin injection method, for example, a RTM method ("Resin Transfer Molding"). The method may be used for manufacturing a component from glass-fiber reinforced plastic (GFRP) or from carbon-fiber reinforced plastic (CFRP).

The heating of the mold according to the invention can be realized with different processes: for example, it may be carried out with the aid of a furnace or autoclave (in which case an additional sealing or closure frame with anchor screws or screw connections on the tool are required) such that the tool has a higher resistance to pressure. It would also be possible to utilize a heat press (this corresponds to a minimal tool geometry; the forces are absorbed by the press and no sprues or suction elements are permitted on the underside/upper side). Alternatively, it would be conceivable to implement a self-heating arrangement, for example, with an electric resistance (hair dryer principle) or with channels in the tool that are filled with thermal oil.

Embodiments of the invention are illustrated in the figures and described in greater detail below.

BRIEF DESCRIPTION OF THE DRAWINGS

FIG. 1 to FIG. 5, an arrangement for manufacturing a composite component according to an embodiment of the invention in different operating states;

Figure 6:
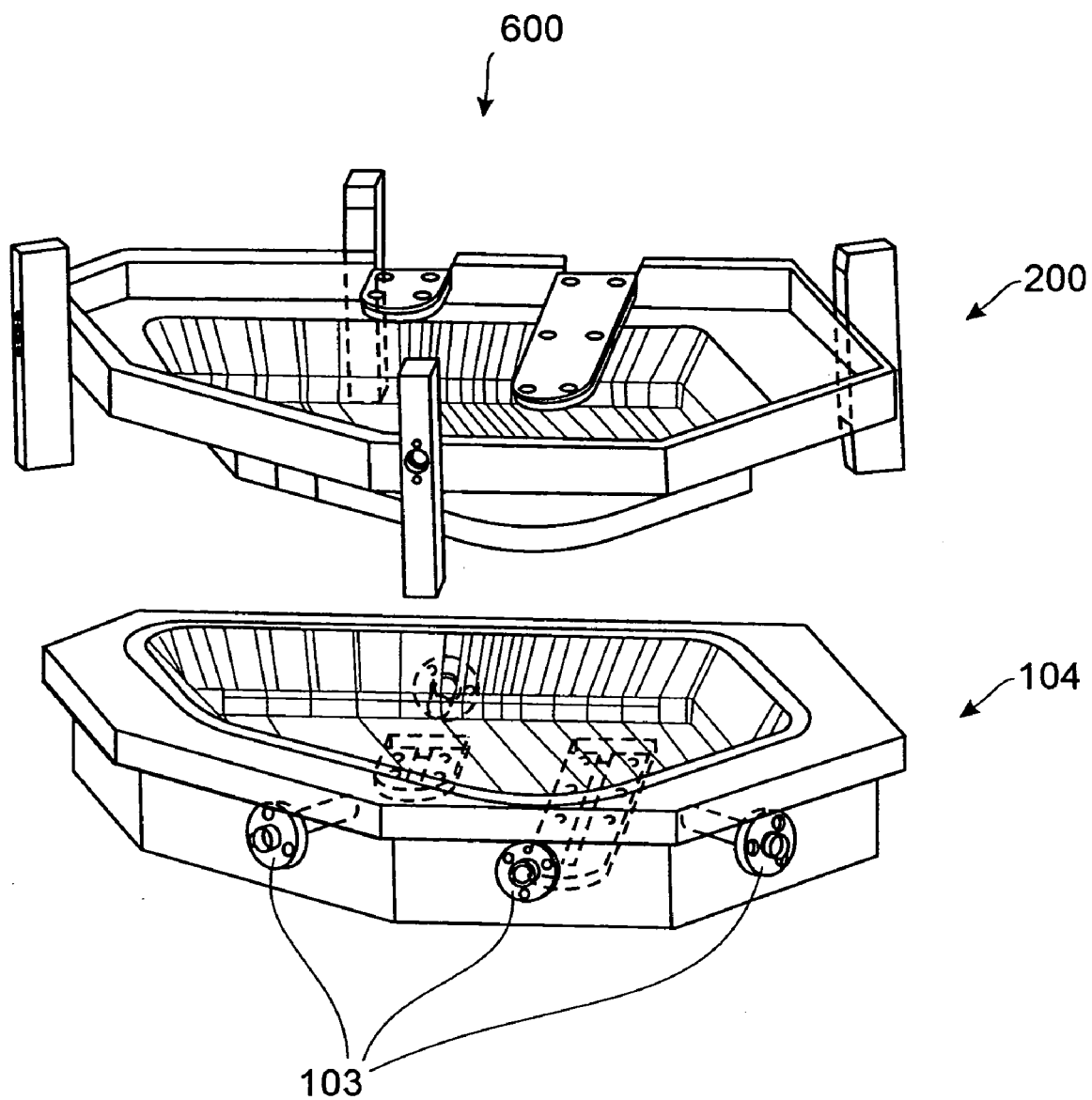
FIG. 6, a device for manufacturing a composite component according to another embodiment of the invention.

DESCRIPTION OF PREFERRED
EMBODIMENTS OF THE INVENTION

Identical or similar components are identified by the same reference numerals in the different figures. The figures show schematic illustrations that are not true to scale.

An arrangement 100 for manufacturing a composite component 301 according to an embodiment of the invention is described below with reference to FIG. 1 to FIG. 5.

FIG. 1 shows the arrangement 100 for manufacturing a composite component by means of a RTM method (Resin Transfer Molding).

The arrangement 100 comprises a device 101 for manufacturing the composite component and a carbon fiber mat 102.

The carbon fiber mat 102 serves as the starting material or semi-finished product for manufacturing a CFRP composite component as described in detail below.

FIG. 1 also shows injection nozzles 103 in a metal trough 104 that serve for injecting a resin material into a space between the trough 104 and a cover described further below in ensuing processing steps such that injected resin material can mix with the carbon fiber mat 102. In FIG. 1, the starting material in the form of the carbon fiber mat 102 is placed into the trough 104 in order to manufacture a composite material.

In addition, FIG. 1 shows a heater 105 for heating the trough 104 and a cover that is described further below, wherein said heater 105 is used for heating the starting materials to a predetermined hardening temperature in a subsequent processing step for manufacturing the composite component.

The arrangement 100 is described below in a subsequent processing state during the manufacture of a composite component with reference to FIG. 2.

In the operating state shown in FIG. 2, a cover 200 is attached to the trough 105 provided with the carbon fiber mat 102 such that the carbon fiber mat 102 is enclosed between the trough 104 and the cover 200 in an air-tight fashion for the subsequent manufacture of the composite component. The trough 104 and the cover 200 are molding elements such that the geometric structure of the cavity enclosed by the trough 104 and the cover 200 determines the shape of the composite component to be manufactured.

The trough 104 is manufactured from a nickel-steel-cobalt alloy that has a coefficient of expansion of $1.15 \cdot 10\text{-}6$ K−1 at a hardening temperature of 180° C. for the manufacture of the composite component. At a hardening temperature of 180° C., the carbon fiber mat 102 also has a linear coefficient of thermal expansion of approximately $1.15 \cdot 10\text{-}6$ K−1. The cover 200 is manufactured from a nickel-cobalt-steel alloy with a coefficient of expansion that lies slightly above $1.15 \cdot 10\text{-}6$ K−1.

According to FIG. 3, injection attachments 300 are inserted into the injection nozzles 103 of the trough 104 in order to inject liquid epoxy resin to be mixed with the carbon fiber mat 102 into the space sealed by the trough 104 and the cover 200.

The carbon fiber mat 102 impregnated with epoxy resin is heated to approximately 180° C. by means of the heater 105 such that the carbon fiber mat 102 impregnated with epoxy resin hardens and a CFRP structural component 301 is produced.

After the apparatus shown in FIG. 3 is cooled to a temperature that lies close to room temperature, the cover 200 is removed in order to expose the upper side of the CFRP structural component 301 (carbon-fiber reinforced plastic) (see FIG. 4).

Since the coefficient of expansion of the material of the trough 104 only differs insignificantly, if at all, from that of the CFRP structural component 301, the CFRP structural component 301 does not firmly shrink onto the trough 104 during the cooling process. It should also be noted that the coefficient of expansion of the cover 200, which is only slightly higher than those of the trough 104 and of the CFRP structural component 301, makes it possible to remove the cover 200 without the CFRP structural component 301 adhering or being shrunk onto the cover 200 and without the cover getting stuck on the cavity.

According to FIG. 5, the CFRP structural component 301 can be separated and/or removed from the trough 104 by means of a simple suction device 302 (for example, a vacuum pump with a suction surface).

A RTM device 600 according to an exemplary embodiment of the invention for manufacturing a structural component by means of a RTM method (Resin Transfer Molding) is described below with reference to FIG. 6.

The RTM device 600 resembles the device 101 shown in FIG. 1 to FIG. 5. However, FIG. 6 shows a three-dimensional representation of this tool in the form of a device for manufacturing a three-dimensional composite component. FIG. 6 shows an exploded view of the RTM device 600, in which the cover 200 is illustrated separately of the trough 104.

In order to manufacture a structural component, the cover 200 is lowered after a carbon fiber mat was inserted into the trough 104 such that a sealed cavity, in which the carbon fiber mat is embedded, is formed between the cover 200 and the trough 104. Subsequently, liquid epoxy resin material is injected into the cavity between cover 200 and the trough 104 through injection nozzles 103 such that the liquid epoxy resin is mixed with the carbon fiber mat 102. A structural component is produced by tempering the arrangement consisting of the carbon fiber mat 102 impregnated with the epoxy resin.

The structural component is effectively prevented from shrinking onto the trough 104 and/or the cover 200 due to the selection of the material used for the trough 104 and for the cover 200 as well as the starting materials for producing the structural component.

The cover 200 can be subsequently detached in order to remove the thusly produced structural component from the trough 104.

One suitable material for the trough 104 and for the cover 200 is Fe-33Ni-4.5Co. This material has a very low thermal expansion in the temperature range between −50° C. and +200° C. and is therefore also referred to as Superinvar™ material. The linear coefficient of thermal expansion (expressed in 10-6° C.−1) of Superinvar™ is 0.45 at 100° C., 1.15 at 200° C., 3.75 at 300° C., 6.70 at 400° C., 8.75 at 500° C. and 10.15 at 600° C.

FIG. 7A to FIG. 7D show an exemplary field of application for composite components manufactured in accordance with the invention, namely for mountings provided on an aircraft.

Figure 7:
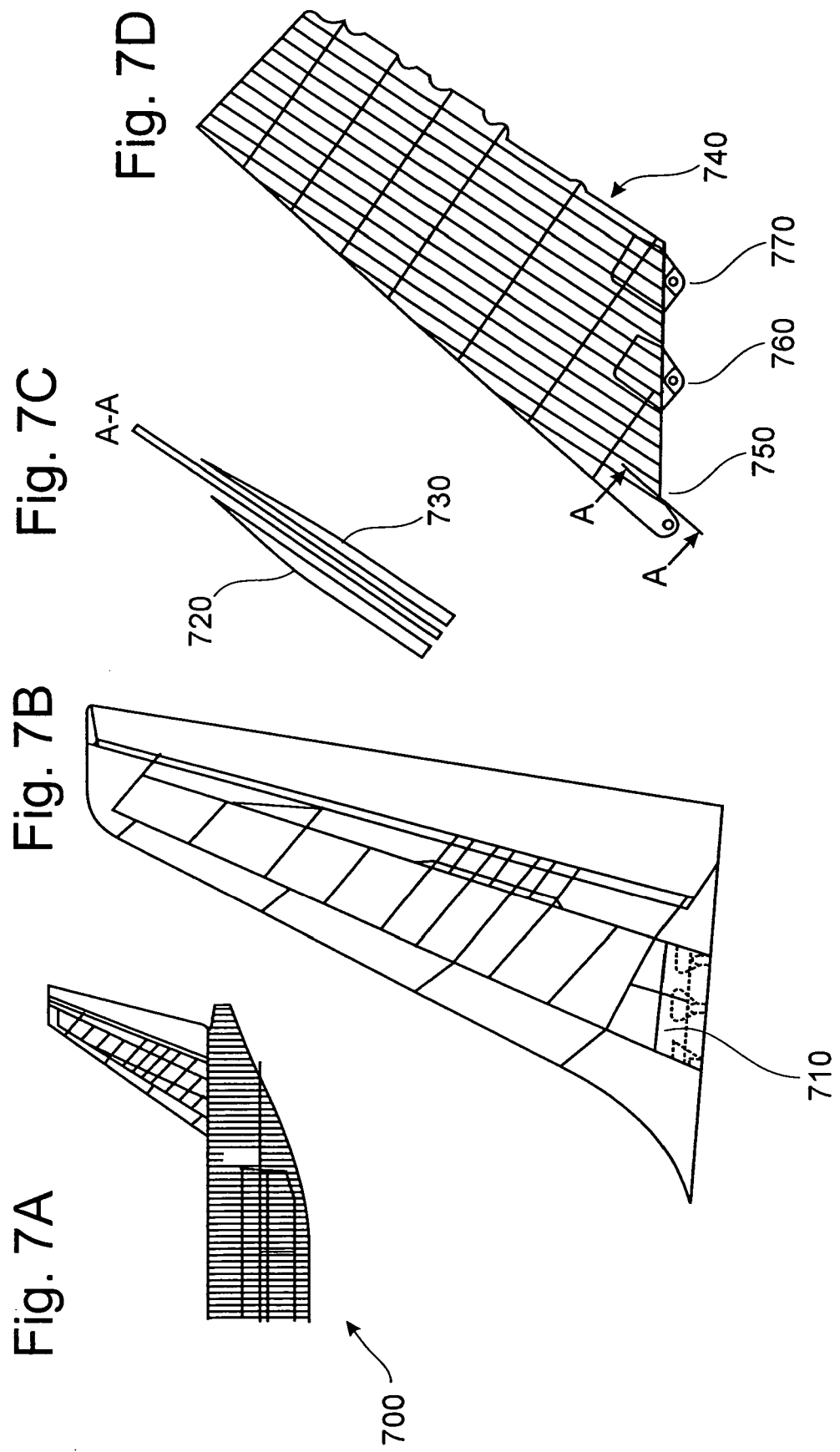
FIGS. 7A to 7D, illustrations of composite components that were manufactured in accordance with the invention and implemented in an aircraft.

FIG. 7A shows a tail section of an aircraft 700. FIG. 7B shows a center box with fuselage connection mountings 710. FIG. 7C shows an outer mounting 720 and an inner mounting 730. FIG. 7D shows a lateral shell 740 with a front axial force mounting 750, with a central axial force mounting 760 and with a rear axial force mounting 770.

A top view of a RTM tool 800 is described below with reference to FIG. 8.

Figure 8:
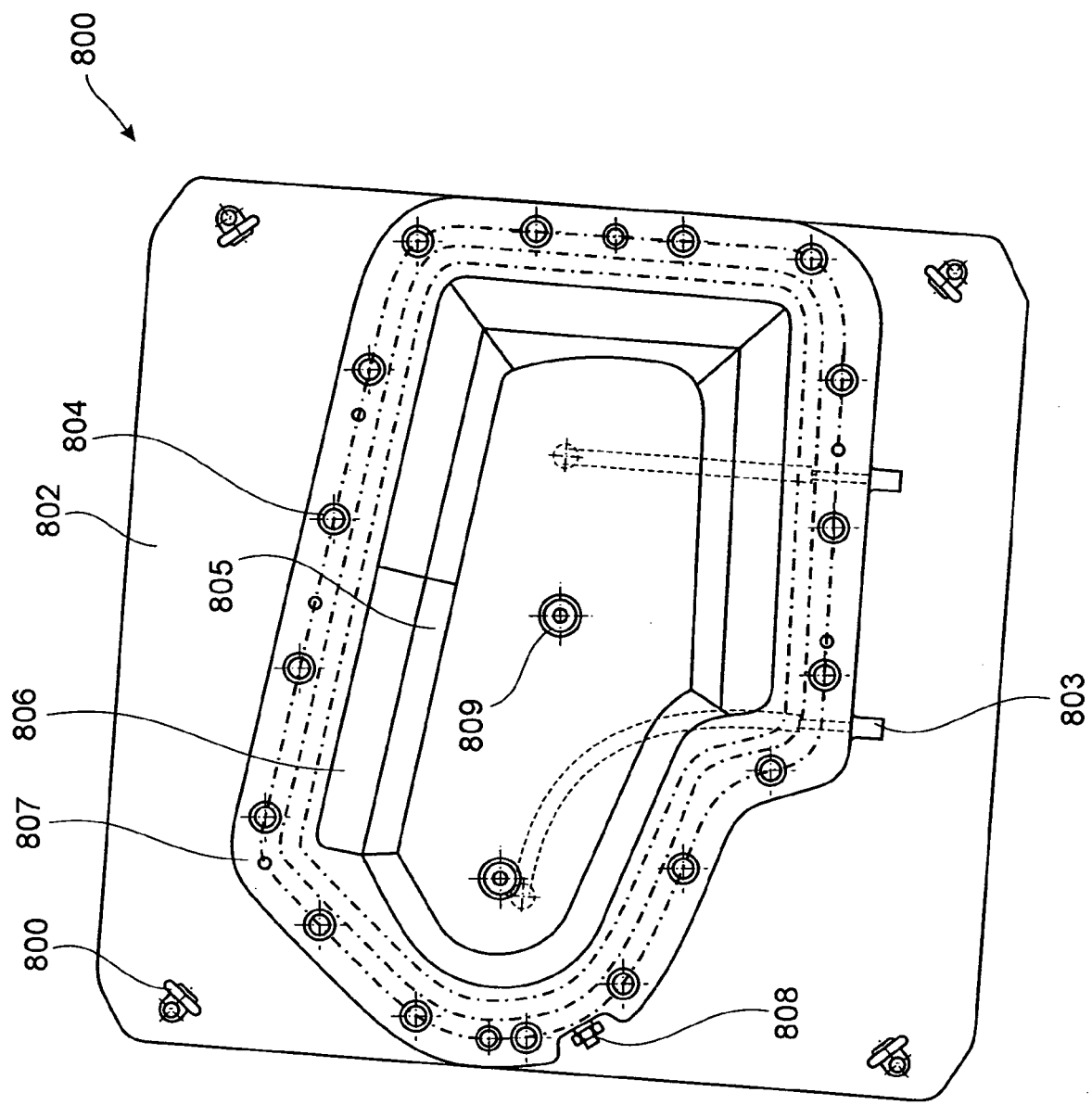
FIG. 8, a top view of a RTM tool.

FIG. 8 shows a limit stop means 801 on a device carrier 802. In addition, a thermo element 803 is provided for monitoring of the temperature. FIG. 8 also shows cover screws 804, mold strips 805, wedge strips 806 and a lower cavity 807. Resin can be supplied via an injection connector 808. The supplied resin is introduced at a resin outlet point 809 and subsequently mixed with the fiber mat.

An exemplary method for manufacturing a component is described below.

Semi-finished fiber products are initially cut to size by means of an ultrasonic cutter. The loose blanks are then manually placed into a preforming device of aluminum. The layer blanks are baked into a preform under a vacuum mat in a solarium at approximately 60° C. (previously the blanks were directly placed into the RTM device). The composite part is then placed into the manufacturing means. The RTM device is locked in a vacuum-tight and pressure-tight fashion and the pressure hoses for the injection and the discharge of the resin are connected. The liquid resin is injected under pressure into the RTM device that is subjected to a vacuum. The injection temperature lies between 130° C. and 145° C. The injection pressure lies between 1.0 bar and 4.0 bar, wherein a holding pressure of 7.0 bar is adjusted. The injection time is 45 minutes. The liquid resin is transformed into the solid state at a temperature of 180° C. The hardening time is approximately 1.5 hours. Subsequently, the average processing temperature of 180° C. is lowered to a temperature below 50° C. and the component is removed from the mold. The quality assurance of the thusly manufactured component takes place in four stages: visual inspection after the removal from the mold, ultrasonic testing on a squaiter system, manual ultrasonic testing and conclusive final testing. The components are ready for shipping after the mechanical processing and the machining of bored and milled structures.

A manufacturing principle according to another embodiment of the invention for manufacturing plane aircraft parts of CFRP by means of the RTM method is described below.

Two peculiarities of this concept are the manufacture of the preform (pre-compression of the layer blanks) and the device used for manufacturing aircraft components that does not require inserted cores (the inserted cores required until now can be completely eliminated due to the utilization of a new material for the device, namely Ni33Co).

A preforming device of aluminum is used for the manufacture of a preform. The resin-impregnated layer blanks of CFRP on the preforming device are baked in a solarium at approximately 50° C. under a vacuum mat such that a composite part is produced which can then be additionally processed in the RTM device. The preforming device should not contain any sharp edges because the vacuum mat in the solarium could otherwise be damaged. Two thermo element are integrated into the bottom of the preforming device, wherein the plug should not protrude over the contour of the preforming device because a kink could otherwise be created therein. The lateral contour is formed by a rigid ring part and a ring part guided on two pins and detachable for the removal from the mold.

Different views of a preforming device 900 for manufacturing a composite component according to an embodiment of the invention are described below with reference to FIG. 9 to FIG. 11.

Figure 9:
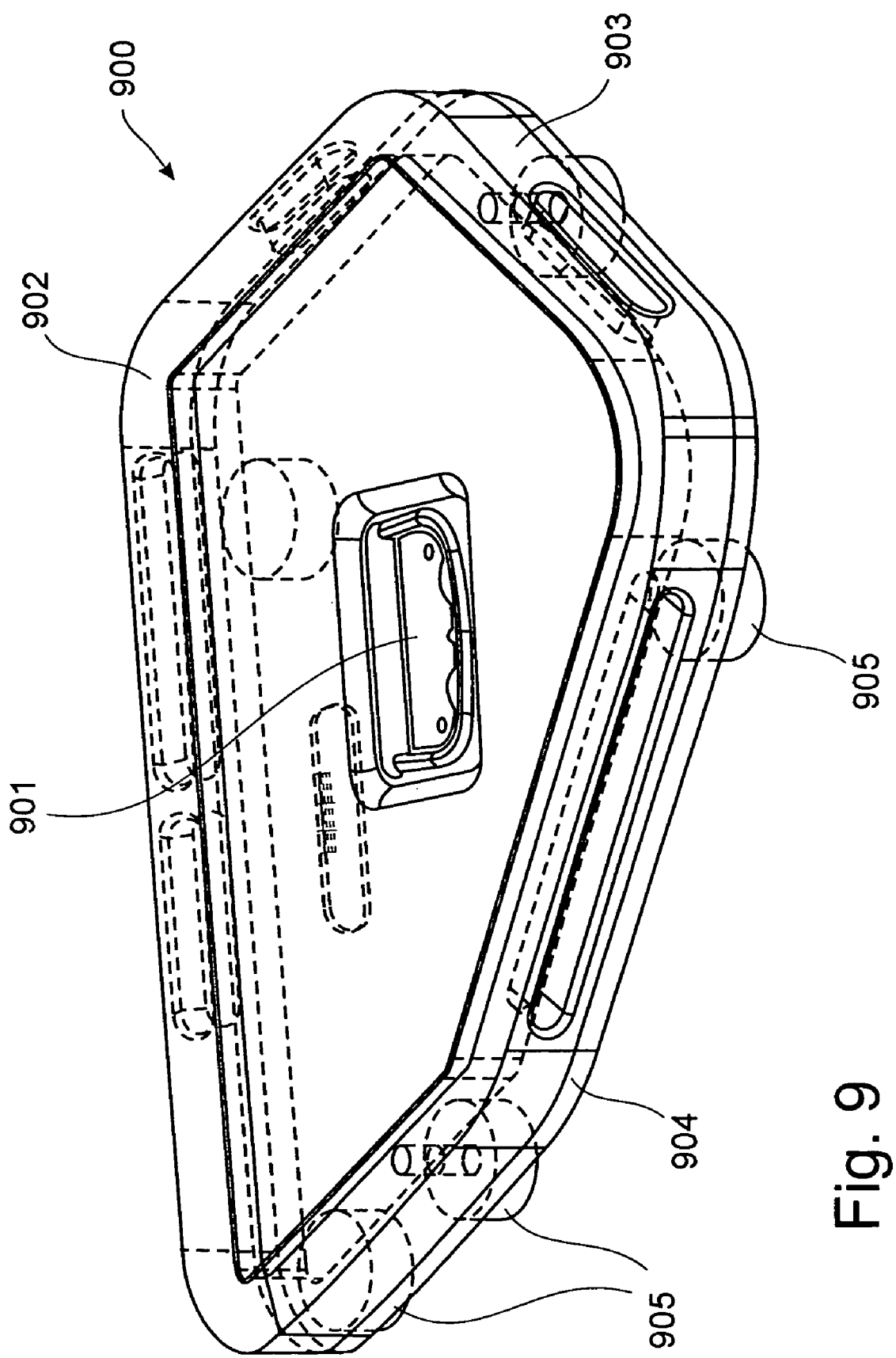
FIGS. 9 to 11, different views of a preforming device for manufacturing a composite component according to another embodiment of the invention, and FIGS. 12 to 16, different views of the device shown in FIG. 6 for manufacturing a composite component according to an embodiment of the invention.

FIG. 9 shows a three-dimensional representation of the preforming device 900 that is provided with a handle 901 in the closed state.

Figure 10:
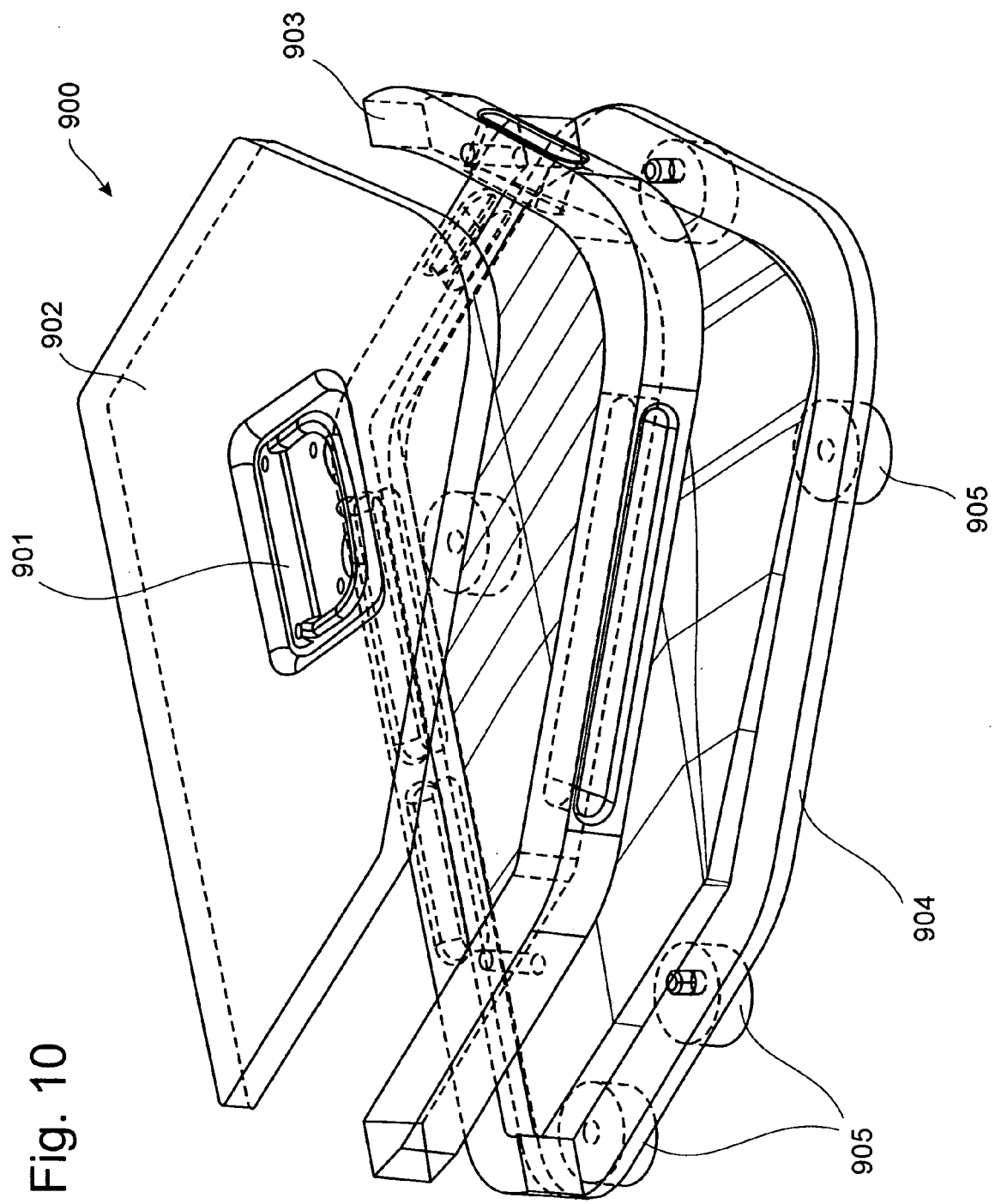

FIG. 10 shows a three-dimensional representation of the preforming device 900, in which the cover 902 is removed.

Figure 11:
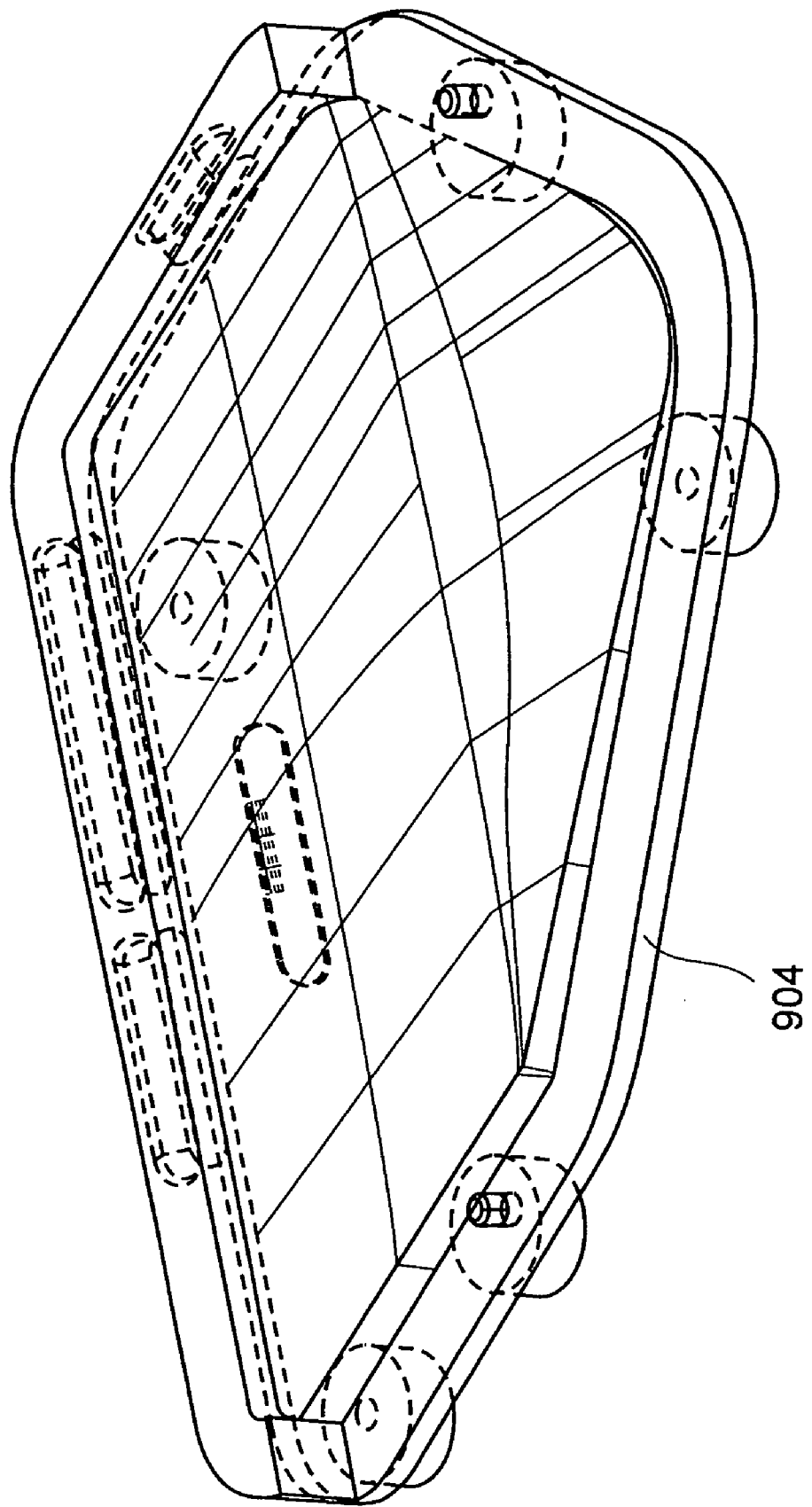

FIG. 11 shows a three-dimensional representation of the preforming device 900, in which the ring attachment 903 is removed.

The preforming device 900 comprises a lower part 904, a ring attachment 903 and a cover 902. The component contour is defined in the lower part 904 and in the cover 902. The ring attachment 903 is realized in a removable fashion in order to simplify the removal of the preform (plugs or pins can be used for centering purposes). Thermo elements can be integrated into the lower part 904. In addition, Teflon legs 905 may be provided. The cover handle 901 can be realized in the form of a folding handle. The weights of the preforming device 900 may lie at approximately 4.7 kg for the lower part 904, approximately 1.6 kg for the stationary ring, approximately 1.8 kg for the loose ring and approximately 4.5 kg for the cover 902 such that the total weight amounts, for example, to approximately 11.6 kg.

When manufacturing CFRP components by means of the RTM method, a device is required in which the CFRP layers can be placed in a controlled fashion and subjected to a vacuum. The resin is injected under the influence of heat and pressure. The component can be removed after the resin has hardened. If a suitable tool material is chosen, the RTM method makes it possible to manufacture components with their final dimensions. FIG. 12 to FIG. 16 show different views of an inventive embodiment of the device 600 for manufacturing a composite component that is illustrated in FIG. 6.

Figure 12:
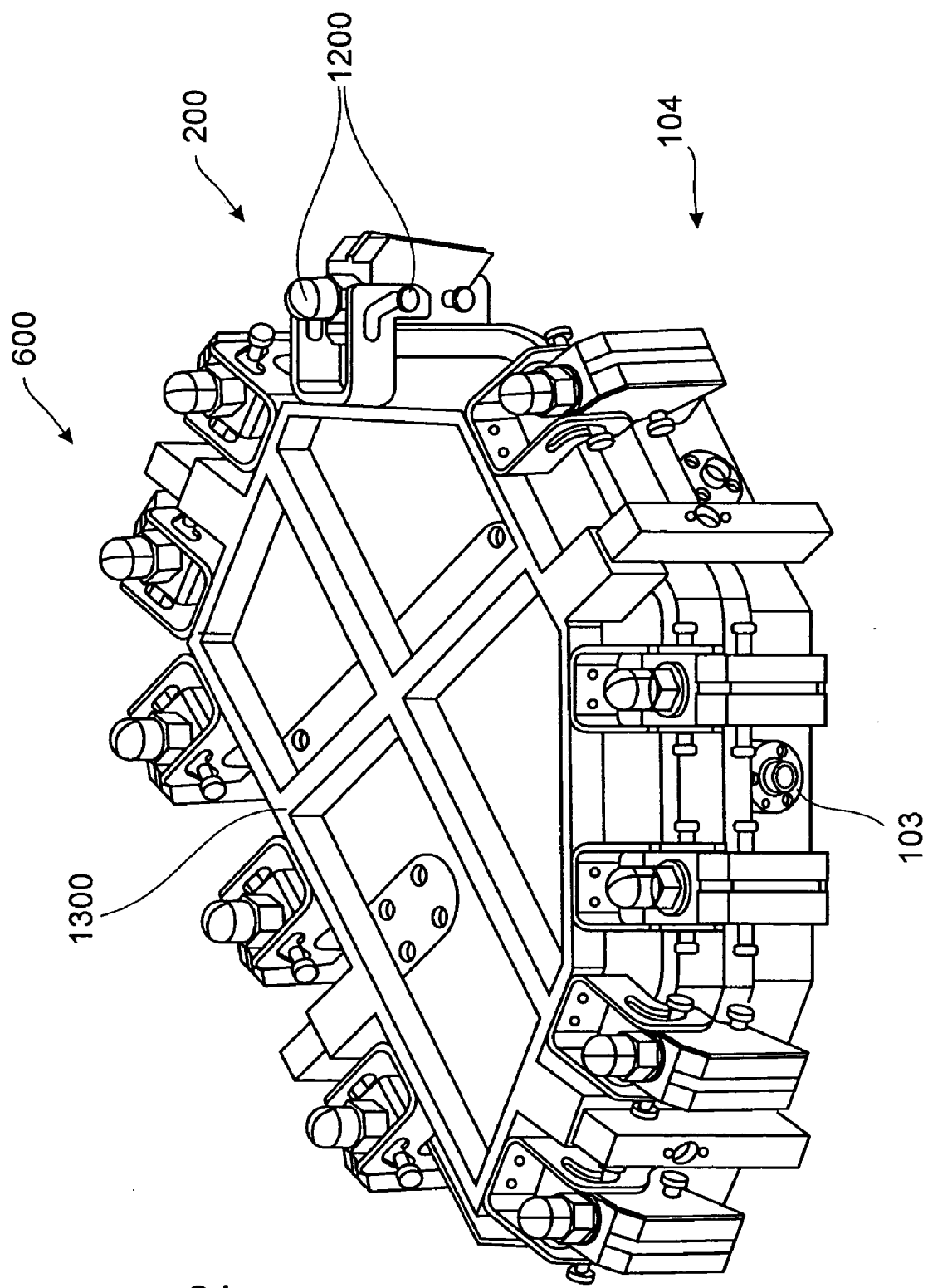

FIG. 12 shows a three-dimensional representation of the device 600 that is provided with anchor screws 1200 in the closed state.

Figure 13:
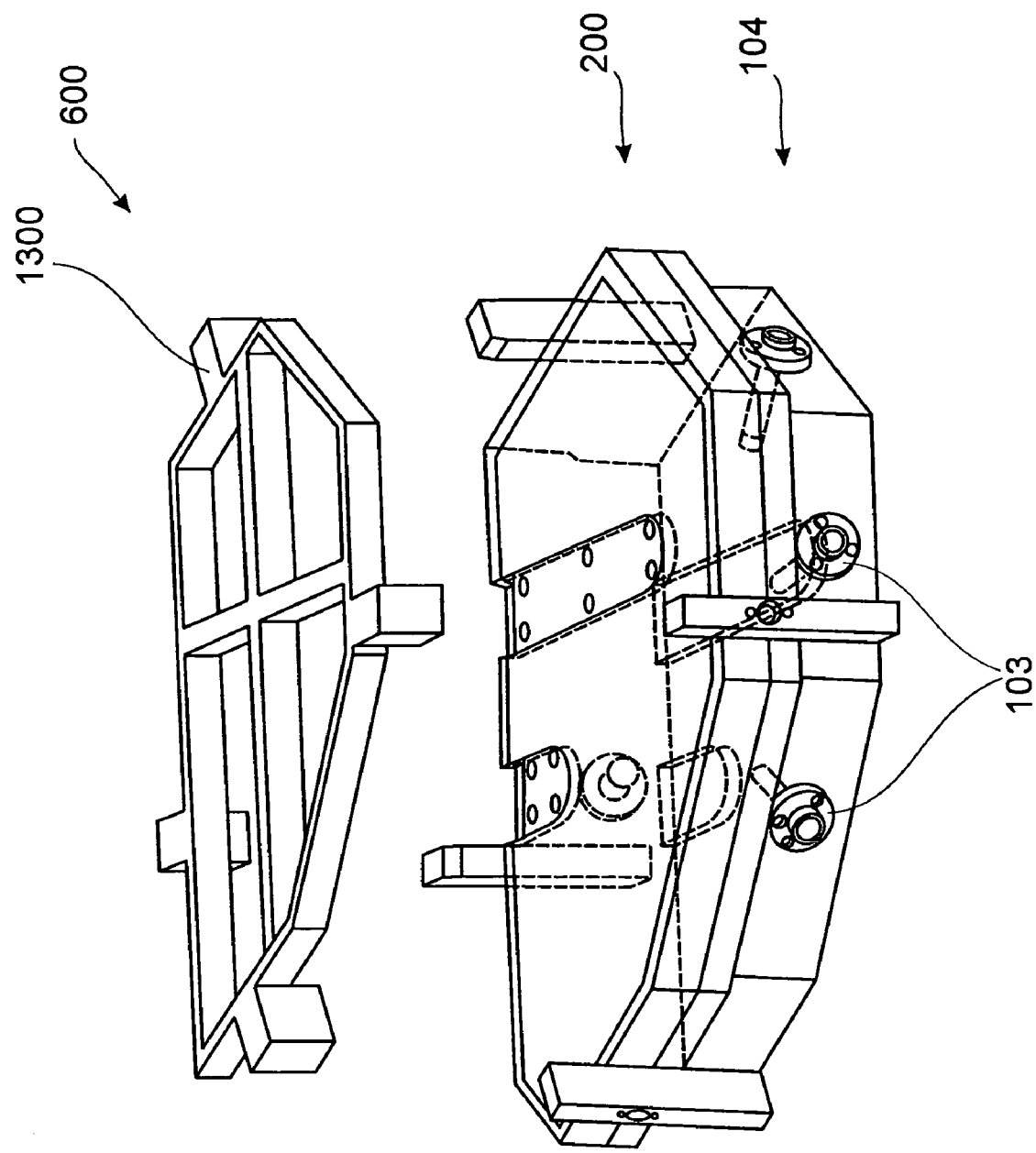

FIG. 13 shows a three-dimensional representation of the device 600 with a frame centering arrangement 1300 above the cover 200.

Figure 14:
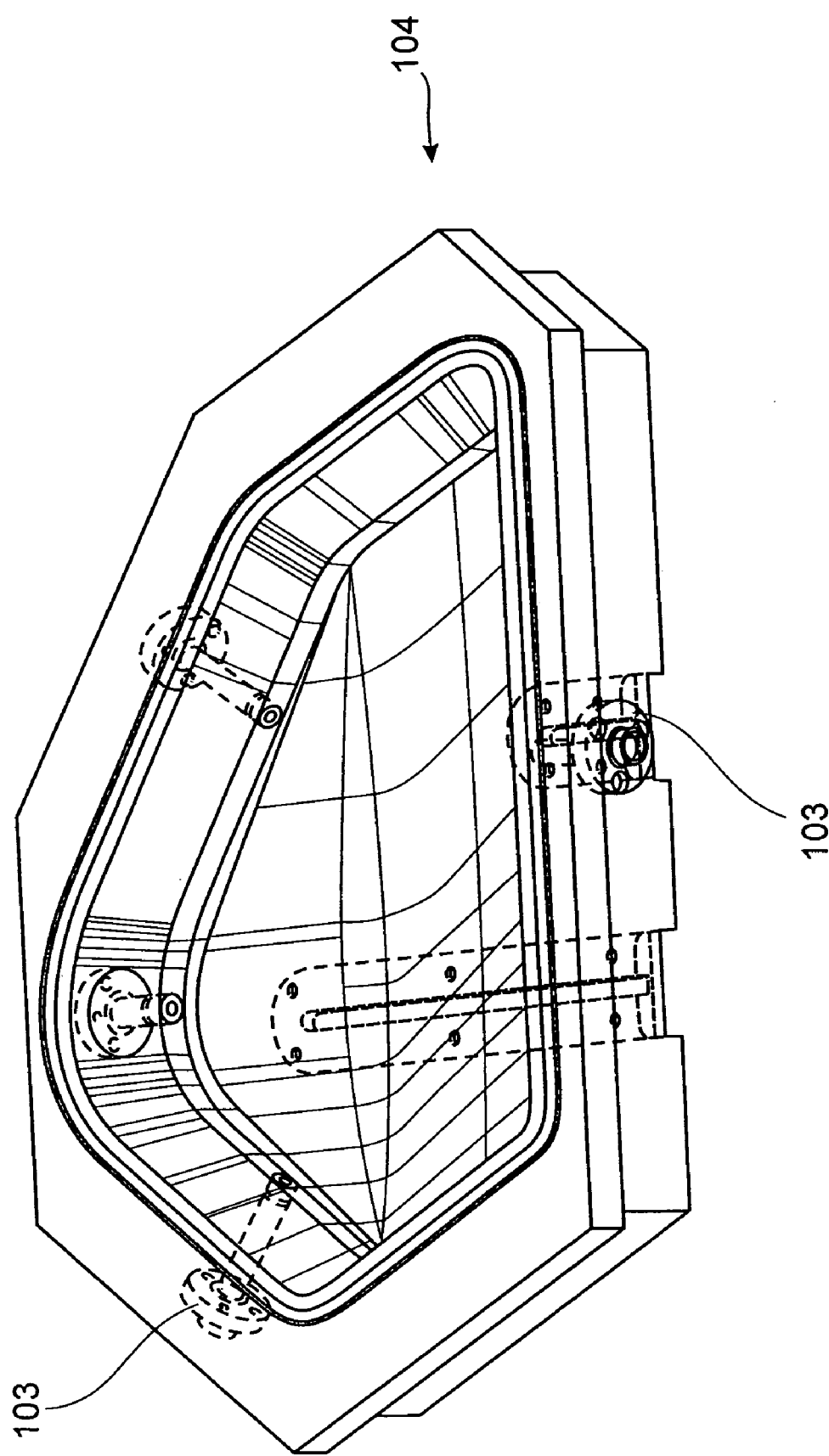

FIG. 14 shows a three-dimensional representation of a cavity in the form of the trough 104 with a sprue gap on the melt edge.

FIG. 15 and FIG. 16 show cross-sectional representations of the device 600 with a sprue and a suction device 1500 in the closed state.

According to an exemplary embodiment, the device 600 merely comprises the cavity 104, the cover 200 and a frame. Inserted cores are not required because the tool material (Ni33Co) does not shrink onto the component during the cooling process. The gap between the cover 200 and the cavity 104 in the region of the melt edge should lie between 0.1 and 0.3 mm and not become larger toward the sprues. Three sprues and a suction element may be provided. The injection and suction nozzles should be realized such that resin residues can be removed from outside (knocked through). Centering elements should be arranged on the cover 200 and simultaneously serve for the centering of the frame and as a protection during the attachment of the cover 200. The frame should be provided with anchor screws 1200 for the manufacture in a furnace. It is advantageous to provide a double seal in the cavity 104. Thermo elements may be provided for monitoring the manufacturing process.

The described technology provides the following advantages: the component quality can be optimized with the preform manufacture because fewer air inclusions occur. In addition, the reject rate caused by a faulty layer assembly or the sliding of the layers in the RTM tool can be minimized. The technology is suitable for automation. A significant simplification of the tooling and the removal from the mold can be achieved with a Ni33Co RTM tool that does not contain any inserted cores. The cleaning procedure is also significantly simplified. The technology is also suitable for the manufacture in a heat press. An extension of the tool service life is realized due to the reduced wear. The technology is suitable for automation.

A significant cost reduction in the RTM manufacture of plane mounting parts can be achieved by combining the two methods (preforming and RTM). The method is very suitable for an automated manufacturing process (production lines, etc.).

It should be added that "comprising" does not exclude any other elements or steps, and that "a" or "an" does not exclude a plurality. It should also be noted that features or steps that were described with reference to one of the embodiments elucidated above can also be used in combination with other characteristics or steps of other described embodiments. The reference symbols in the claims should not be understood in a restrictive sense.

What is claimed is:

1. A Resin-Transfer-Molding-device for manufacturing a component, from a starting material, the device comprising:
    a trough configured to receive the starting material;
    a cover positioned and configured to be attached to the trough such that the starting material is enclosed between the trough and the cover defining a cavity of a predetermined shape configured to determine free of any inserts in the cavity a shape of the component;
    a heating device for manufacturing the component by heating the starting material enclosed between the trough and the cover to a predetermined hardening temperature in an operating state,
    wherein the trough has a coefficient of expansion greater than the coefficient of expansion of the trough, and
    wherein in an operating state at the predetermined hardening temperature the cavity is sealed in an air tight manner by the trough and the cover due to the trough having a coefficient of expansion different from the coefficient of expansion of the cover.

2. The Resin-Transfer-Molding-device of claim 1, comprising an injection device configured to introduce starting material between the trough and the cover in a state of the device in which the cover is attached to the trough.

3. The Resin-Transfer-Molding-device of claim 2, wherein the injection device is positioned in the trough.

4. The Resin-Transfer-Molding-device of claim 1, wherein at least one number of the group consisting of the trough and the cover has a coefficient of expansion that deviates by less than 25% from the coefficient of expansion of the starting material.

5. The Resin-Transfer-Molding-device of claim 1, wherein at least one member of the group consisting of the trough and the cover comprises a material with a coefficient of expansion that deviates by less than 10% from the coefficient of expansion of starting material.

6. The Resin-Transfer-Molding-device of claim 1, wherein at least one member of the group consisting of the trough and the cover has a coefficient of expansion between $1.0 \cdot 10^{-6} K^{-1}$ and $1.3 \cdot 10^{-6} K^{-1}$.

7. The Resin-Transfer-molding-device of claim 1, wherein at least one member of the group consisting of the trough and the cover has a coefficient of expansion between $1.1 \cdot 10^{-6} K^{-1}$ and $1.2 \cdot 10^{-6} K^{-1}$.

8. The Resin-Transfer-Molding-device of claim 6, wherein the cover has a coefficient of expansion higher by no more than $0.2 \cdot 10^{-6} K^{-1}$ than the coefficient of expansion of the trough.

9. The Resin-Transfer-Molding-device of claim 6, wherein the cover has a coefficient of expansion higher by no more than $0.1 \cdot 10^{-6} K^{-1}$ than the coefficient of expansion of the trough.

10. The Resin-Transfer-Molding-device of claim 1, wherein at least one member of the group consisting of the trough and the cover comprises a nickel-steel alloy.

11. The Resin-Transfer-Molding-device of claim 10, wherein at least one member of the group consisting of the trough and the cover comprises a nickel-steel alloy with a nickel content of less than 36 wt. %.

12. The Resin-Transfer-Molding-device of claim 10, wherein at least one member of the group consisting of the trough and the cover comprises a nickel-steel alloy with a nickel content of approximately 33 wt. %.

13. The Resin-Transfer-Molding-device of claim 10, wherein at least one of the member of the group consisting of the trough and the cover is comprises a nickel-steel-cobalt alloy.

14. The Resin-Transfer-Molding-device of claim 1, wherein the trough has a coefficient of expansion slightly lower that the coefficient of expansion of the starting material.

15. The Resin-Transfer-Molding-device of claim 1, wherein the trough has a coefficient of expansion lower b at most 5% than that the coefficient of expansion of starting material.

16. A Resin-Transfer-Molding-arrangement for manufacturing a component, the arrangement comprising:
    a trough configured to receive the starting material;
    a cover positioned and configured to be attached to the trough such that the starting material is enclosed between the trough and the cover defining a cavity of a predetermined shape configured to determine free of any inserts in the cavity a shape of the component;
    a heating device for manufacturing the component by heating the starting material enclosed between the trough and the cover to a predetermined hardening temperature in an operating state,
    wherein the trough has a coefficient of expansion greater than the coefficient of expansion of the trough, wherein in an operating state at the predetermined hardening temperature the cavity is sealed in an air tight manner by the trough and the cover due to the trough having a coefficient of expansion different from the coefficient of expansion of the cover, and wherein arrangement is configured to have the starting material introduced into the trough of the Resin-Transfer-Molding-device or to have the starting material at least partially introduced into the trough.

17. The Resin-Transfer-Molding-arrangement of claim 16, wherein the starting material is introduced between the trough and the cover or is at least partially introduced therein.

18. The Resin-Transfer-Molding-arrangement of claim 16, further comprising a vacuum suction device for removing a manufactured component from the arrangement after the cover is removed.

19. The Resin-Transfer-Molding device of claim 1, wherein at least on group of the group consisting of the trough and the cover is manufactured from a material with such a coefficient of expansion that the component shrinks off the at least one of the group consisting of the trough and the cover after manufacture of the component.

* * * * *

UNITED STATES PATENT AND TRADEMARK OFFICE
CERTIFICATE OF CORRECTION

| | | |
|---|---|---|
| PATENT NO. | : 8,191,854 B2 | |
| APPLICATION NO. | : 11/360888 | |
| DATED | : June 5, 2012 | |
| INVENTOR(S) | : Vidina Otten et al. | |

It is certified that error appears in the above-identified patent and that said Letters Patent is hereby corrected as shown below:

In the Claims:

Column 12, line 44, "the trough and the cover is comprises a nickel-steel-cobalt" should be changed to --the trough and the cover comprises a nickel-steel-cobalt--;

Signed and Sealed this
Fourteenth Day of May, 2013

Teresa Stanek Rea
*Acting Director of the United States Patent and Trademark Office*